United States Patent [19]

Naito et al.

[11] Patent Number: 5,715,017
[45] Date of Patent: Feb. 3, 1998

[54] MOTION ESTIMATING SYSTEM

[75] Inventors: Yukihiro Naito; Takashi Miyazaki; Ichiro Kuroda, all of Tokyo, Japan

[73] Assignee: NEC Corporation, Tokyo, Japan

[21] Appl. No.: 675,673

[22] Filed: Jul. 3, 1996

[30] Foreign Application Priority Data

Jul. 7, 1995 [JP] Japan ..................... 7-195998
Oct. 20, 1995 [JP] Japan ..................... 7-273032

[51] Int. Cl.$^6$ .................. H04N 7/32; H04N 7/30
[52] U.S. Cl. .................. 348/699; 348/416; 348/402; 348/413
[58] Field of Search .................. 348/699, 402, 348/407, 416, 409, 413; H04N 7/32, 7/30

[56] References Cited

U.S. PATENT DOCUMENTS

| 5,068,722 | 11/1991 | Sugiyama | 348/699 |
| 5,515,114 | 5/1996 | Murata | 348/699 |
| 5,539,469 | 7/1996 | Jung | 348/699 |
| 5,568,203 | 10/1996 | Lee | 348/699 |
| 5,602,593 | 2/1997 | Katto | 348/699 |
| 5,614,959 | 3/1997 | Jeong et al. | 348/699 |

FOREIGN PATENT DOCUMENTS 1295379  11/1989  Japan ............... H04N 7/32

OTHER PUBLICATIONS

M. Ghanbari, "The Cross–Search Algorithm for Motion Estimation", *IEEE Transactions on Communications*, vol. 38, No. 7, Jul. 1990, pp. 950–953.

Andre Zaccarin et al, "Fast Algorithms for Block Motion Estimation", 0-7803-0532-Sep. 1992 IEEE, pp. III-449–III-452.

Z.J. Mou et al, "Fast Fir Filtering: Algorithms and Implementations", *Signal Processing 13* (1987), pp. 377–384.

*Primary Examiner*—Amelia Au
*Assistant Examiner*—Vu Le
*Attorney, Agent, or Firm*—Sughrue, Mion, Zinn, Macpeak & Seas, PLLC

[57] ABSTRACT

In a motion estimating system, the sum of square values of picture element values of a current block is calculated in a current block square sum calculator and stored in a storage unit. The inner product between the current block and each of some or all of reference blocks in a reference area is multiplied by −2 every reference block, and stored in a memory. Further, the sum of square values of picture elements of some or all of the reference blocks in the reference area is calculated every reference block, and stored a memory. The square sum value of the current block, the product value of −2 and the inner product between the current block and the reference block which corresponds to a motion vector to be searched, and the square sum value of the reference block are added in an adder to set the addition result as an error power value. Finally, the minimum value of the error power is detected to estimate the optimum motion vector.

16 Claims, 11 Drawing Sheets

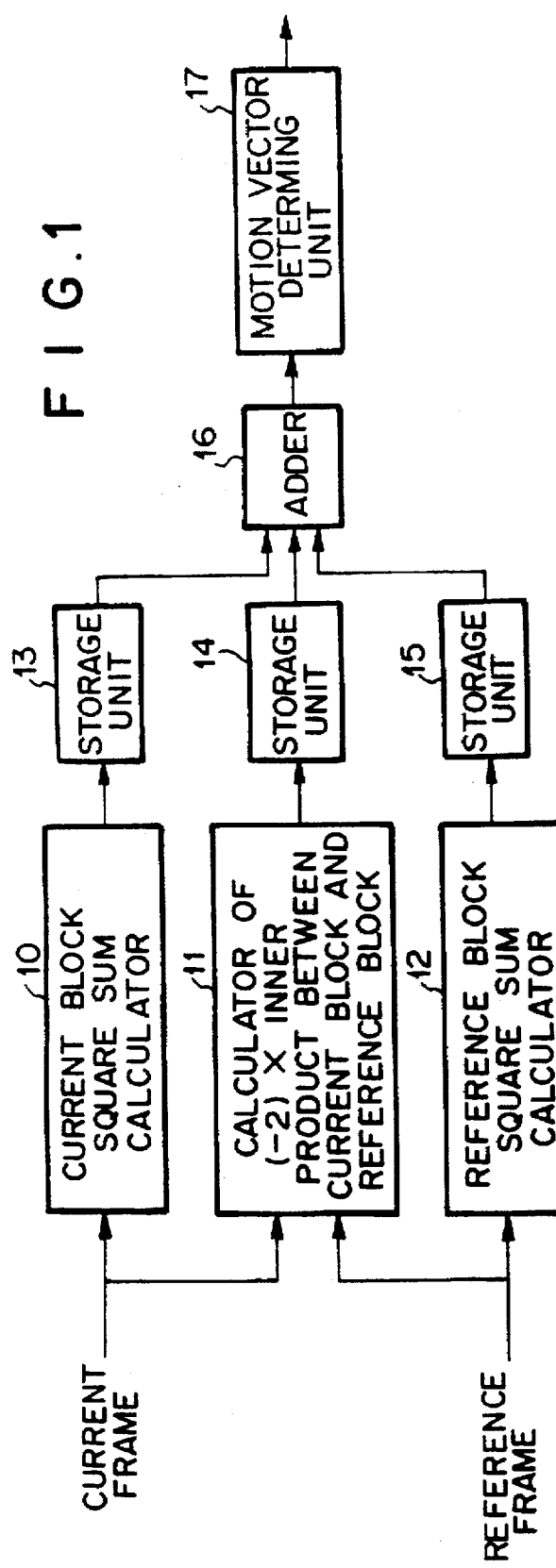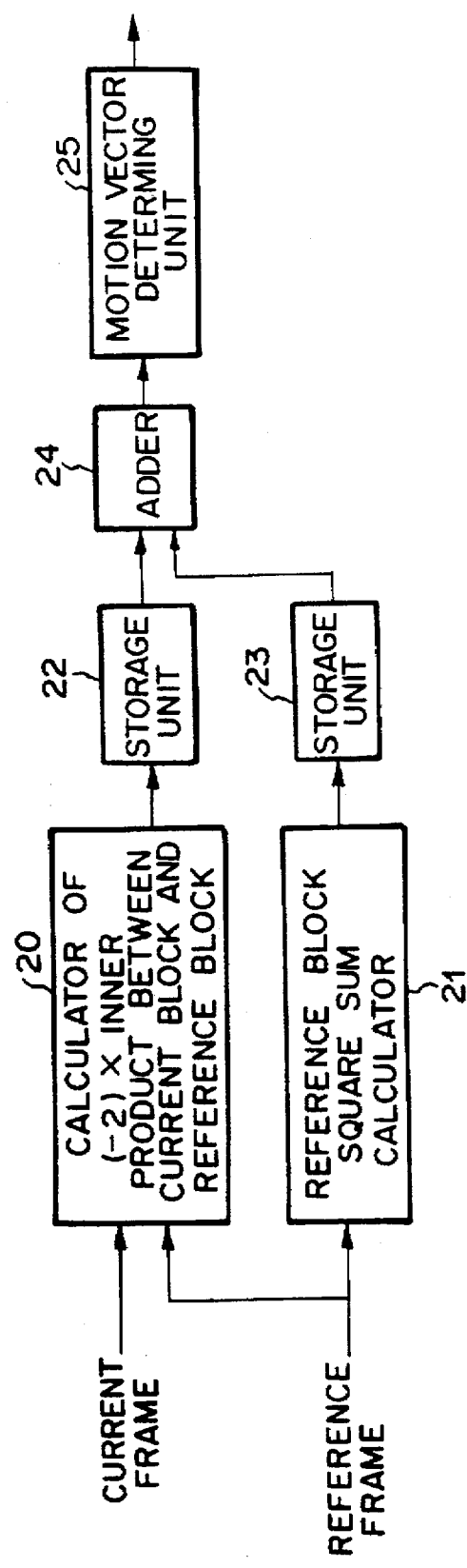

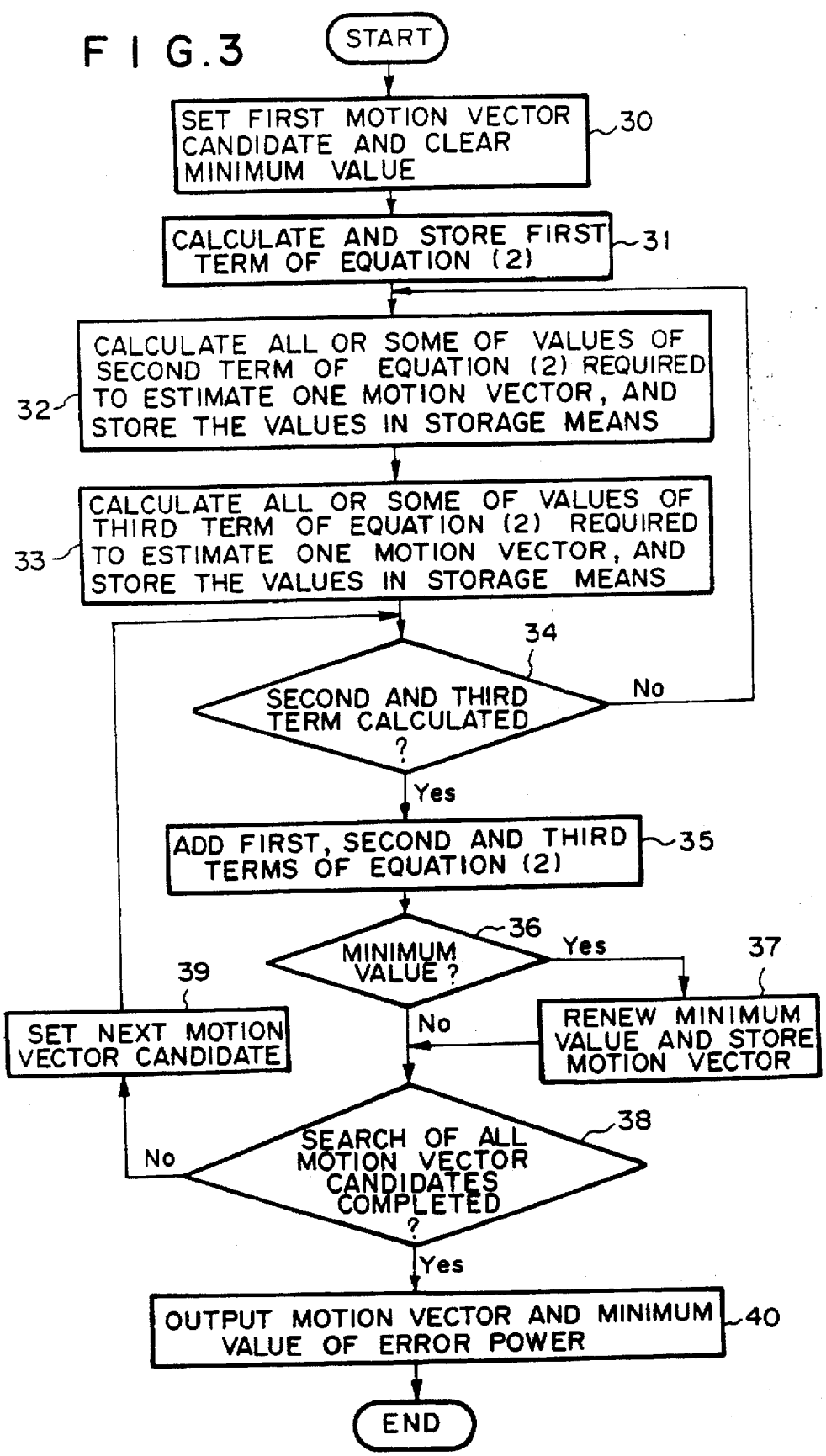

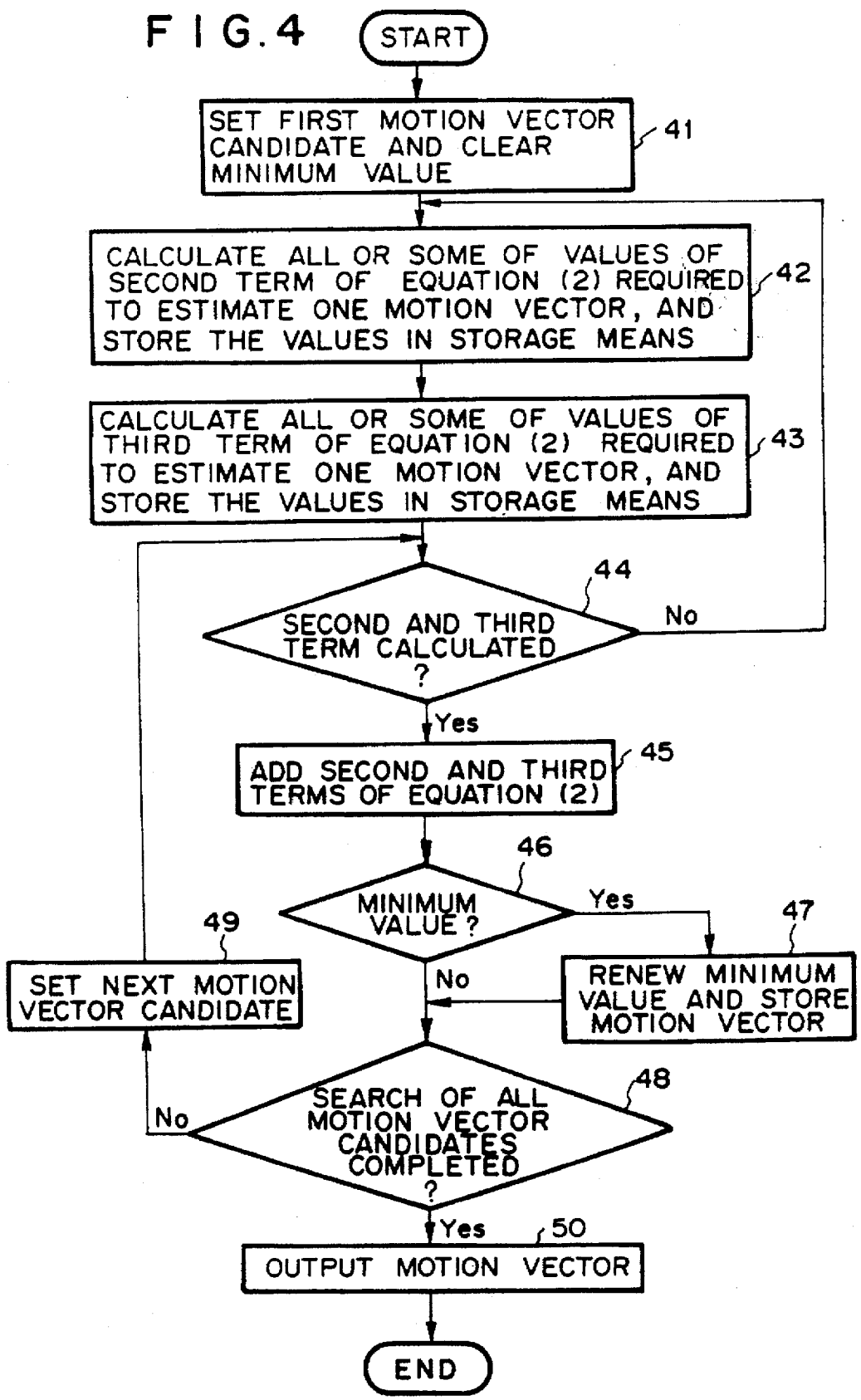

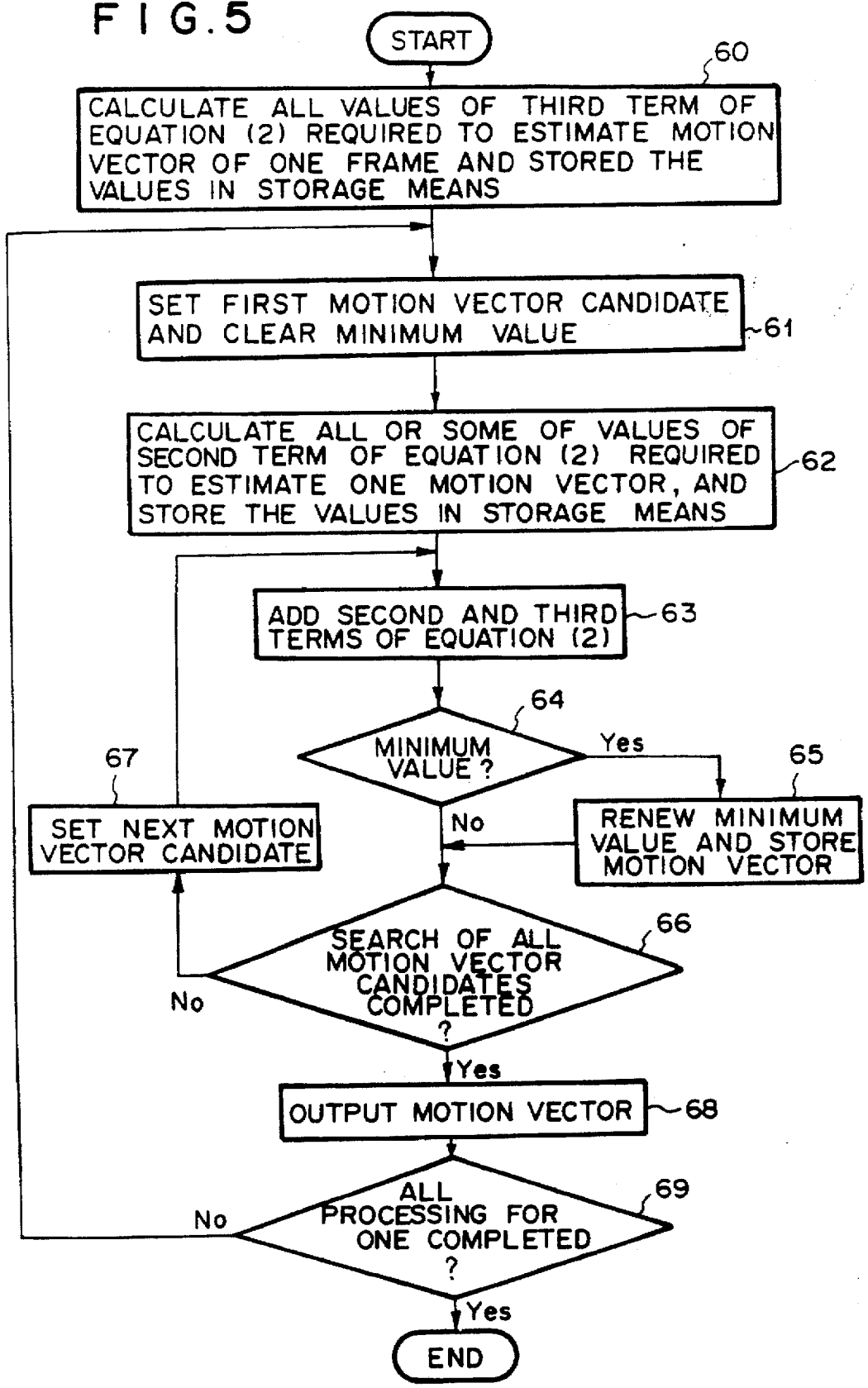

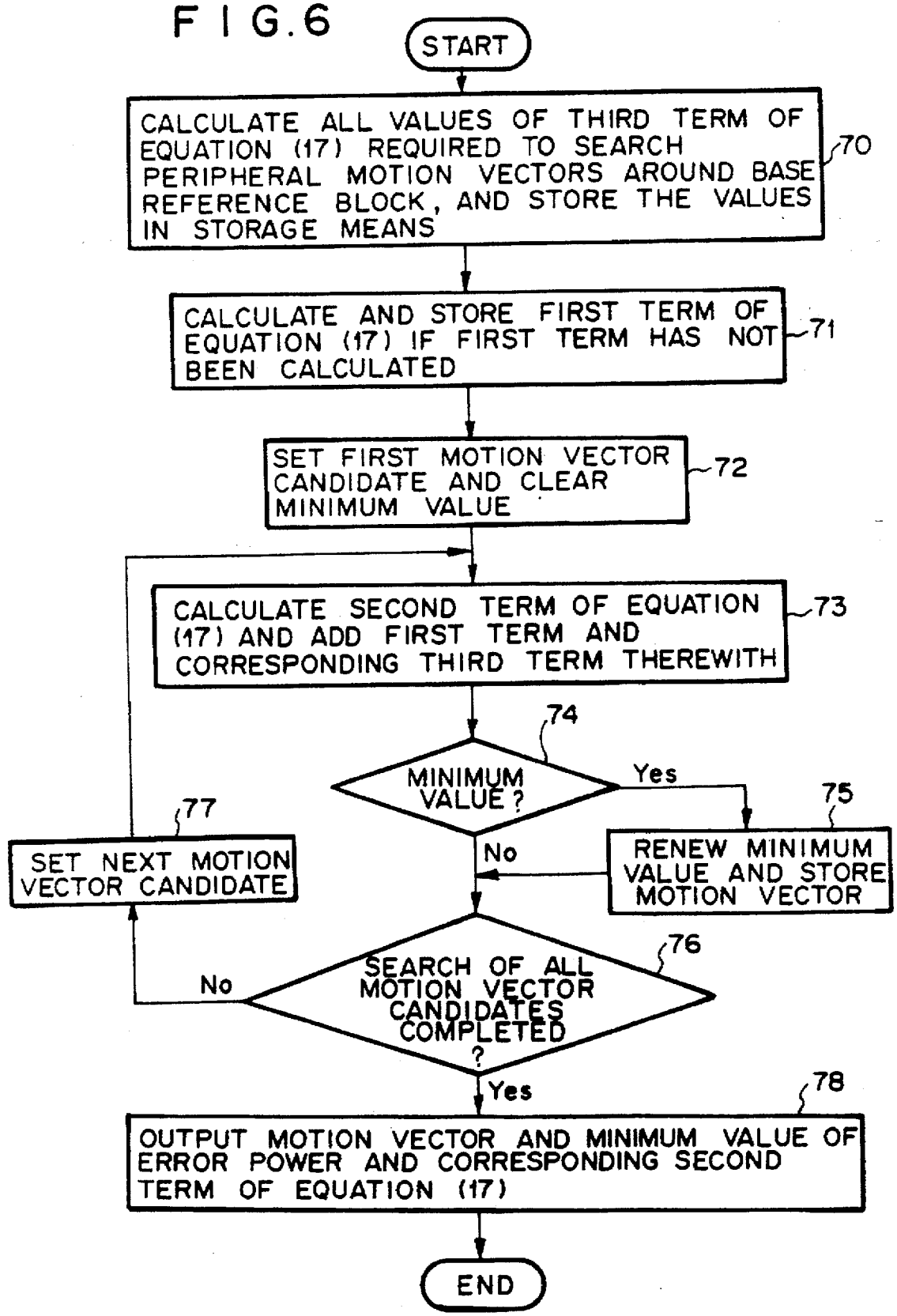

PICTURE ELEMENTS UNNECESSARY
FOR SQUARE SUM CALCULATION

REFERENCE BLOCK FOR MOTION VECTOR (1,-1)

REFERENCE BLOCK FOR MOTION VECTOR (0,0)

REFERENCE AREA

REFERENCE BLOCK WHOSE MOTION VECTOR IS (1,-1) WITH RESPECT TO BASE REFERENCE BLOCK

BASE REFERENCE BLOCK

PICTURE ELEMENT FOR WHICH SQUARE SUM CALCULATION IS REQUIRED

PICTURE ELEMENT FOR WHICH SQUARE SUM CALCULATION IS NOT REQUIRED

90: CURRENT FRAME
91: CURRENT BLOCK

92: REFERENCE FRAME
94: REFERENCE AREA
93: REFERENCE BLOCK

PRIOR ART

5,715,017

MOTION ESTIMATING SYSTEM

BACKGROUND OF THE INVENTION

1. Field of the Invention

The present invention relates to a motion detecting system, and particularly to a motion estimating system for calculating a motion vector by determining from a reference frame a reference block which is most correlative to a current block in a current frame.

2. Description of Related Art

A picture compression coding system which uses motion compensation and an orthogonal transformation in combination has been frequently used in a compression coding technique for pictures, and a block matching type motion estimating system for estimating the motion of an object in pictures has been generally used for the motion compensation. In the following description, "motion compensation" means application of the knowledge of the displacement of a moving object in successive frames, and "pictures" contains both still pictures in which objects in successive frames are still like natural scenes, and moving pictures in which objects in successive frames are moving. For example, Japanese Laid-open Patent Application No. Hei-1-295379 discloses a conventional block matching type motion estimating system.

FIG. 13 is a diagram showing the conventional motion estimating system. In FIG. 13, (a) at the left side represents a current frame 90 and (b) at he right side represents a reference frame 92. In this system, a current frame is divided into plural blocks, and each block (current block) is matched against plural reference blocks in a reference frame. In general, the just-previous frame is used as a reference frame to the current frame. Through the matching operation, a reference block which is most correlative to the current block 91 in the current frame 90 is selected from the reference frame 92 and a motion vector is determined on the basis of the displacement between the current block 91 and the selected reference block 93. Here, the "motion vector" means a vector indicating the amount and the direction of the motion of a moving object between the previous frame and the current frame. Accordingly, for still pictures, the motion vector is equal to zero at all times because the object is still.

In general, the amount of motion between successive frames is estimated to be small in moving pictures. Therefore, an area in which highly correlative blocks are searched is set as a reference area 94 in the reference frame 92 as shown in FIG. 13, and the correlation is calculated for all the reference blocks 93 in the area 94 or intentionally selected reference blocks 93 in the area. As a manner of intentionally selecting reference blocks is known a logarithmic searches method as described at page 82 in ISO/IEC11172-2 which is the standards for moving picture coding and issued in 1993. In the logarithmic searches method, as an example, a reference block having the motion vector (0,0) and other eight reference blocks whose motion vectors are within ±4 around (0,0) are searched, and the optimum reference block (i.e., the highly correlative block) is determined from the reference blocks. Thereafter, eight reference blocks whose motion vectors are within ±2 around the determined optimum reference block are further searched. The search processing as described above is repetitively performed on all the blocks in the current frame to determine the optimum motion vector. The correlation which is the estimation quantity in the search is generally estimated by calculating the absolute value or square value of the difference in picture element value between the current block and the reference block on a picture element basis, and adding these absolute values or square values of all the picture elements over the block.

FIG. 14 is a block diagram showing a processor having an arithmetic and logic calculator 95 and a sum-of-products calculator 96. When the calculation of summing the absolute values of the difference in picture element value between the current block and the reference block is used to estimate the correlation, a differential calculation, an absolute value calculation and an addition (summation) calculation are performed in the arithmetic and logic calculator 95. Therefore, in this case, the overall calculation needs 3 cycles per picture element. On the other hand, when the calculation of summing the square values of the difference in picture element value between the current block and the reference block is used to estimate the correlation, a differential calculation is performed in the arithmetic and logic calculator 95 while the sum of the square values is calculated in the sum-of-products calculator 96 and a cumulative register 97. Therefore, the overall calculation can be performed at two cycles per picture element. Each of the differential calculation result and the square sum calculation result is stored in a storage device 98.

FIG. 15 is a flowchart for the correlation estimation based on the square sum calculation. In the following description, the sum of the square values of the difference in picture element value between the current block and the reference block is referred to as "error power value".

Representing the size of a block by N×X N; the picture element value of the current block by $x_{i,j}$; and the picture element value of the reference area by $Y_{i,j}$, the error power value for a motion vector (u,v) is represented by the following equation (1). In the following equation, N represents an integer which is larger than 1, and $X_{0,0}$ represents the picture element value at the upper left corner of the current block.

$$e_{u,v} = \sum_{i=0}^{N-1} \sum_{j=0}^{N-1} (x_{i,j} - y_{i+u,j+v})^2 \qquad (1)$$

Assuming that 1 cycle is needed as a time for the sum-of-products calculation and 1 cycle is needed as a time for the differential calculation, the calculation of the error power value per block needs 2×N×N cycles. The motion vector for one block in the current frame can be detected by repetitively performing the above calculation on all the reference blocks for which the correlation is calculated. This operation is further successively performed on all the selected blocks in the current frame to determine the final motion vector for the current frame.

According to the flowchart of FIG. 15, a difference value of $(x_{i,j} - Y_{i+u,j+v})$ is first calculated in a differential calculation step 100, and then $e_{u,v}$ is calculated from the equation (1) in a square sum calculation step 101. Thereafter, it is judged whether the calculation on all the picture elements between the current block and a reference block is completed (in step 102). If the judgment of step 102 is "YES", it is judged whether the calculation on all the search points (i.e., the calculation between the current block and all the reference blocks) is completed (in step 103). If the judgment of the step 103 is "YES", the minimum value of the calculated values $e_{u,v}$ is searched (in step 104), and the motion vector that corresponds to the minimum value is output, and the program is finished.

When the motion estimation is performed by the processor having the arithmetic and logic calculator and the sum-of-products calculator as shown in FIG. 15, 2 cycles are needed per picture element for the correlation calculation between a current block and a reference block, and this 2-cycle operation is required to be performed on all the picture elements of the block. The correlation calculation as described above is further required to be performed between the current block and each of plural reference blocks, and this operation must be finally performed on all the blocks in a current frame. Therefore, the amount of the overall calculation is very large.

On the other hand, a picture compression coding which is used for a video conference or the like needs real-time processing. The amount of the calculation for the motion estimation is given much weight in the picture compression coding processing, and thus in order to miniaturize the scale of the processor or enhance the performance of the processor, the calculation amount of the motion estimation has been required to be reduced as much as possible. However, no technique for satisfying this requirement has been achieved.

SUMMARY OF THE INVENTION

Therefore, an object of the present invention is to provide a motion estimating system in which the calculation amount required for a motion estimation by a processor having an arithmetic and logic calculator and a sum-of-products calculator can be greatly reduced.

In order to attain the above object, according to a first aspect of the present invention, a motion estimating system in which a frame is divided into plural blocks and a reference block which is most correlative to a current block in a current frame is detected from a reference frame to determine a motion vector, is characterized by comprising means for calculating sum of the square values of picture element values in the current block, inner product calculation means for calculating the inner product between the picture element values of the current block and some or all reference blocks in a reference area of the reference frame and multiplying the calculated inner product by −2 on a block by block basis, first reference block square sum calculation means for calculating the sum of square values of the picture element values of some or all the reference blocks in the reference area of the reference frame, means for successively calculating error power values by adding the sum of square values of the picture element values of the current block on a block by block basis, the value obtained by multiplying the inner product between the current block and the reference block by −2, and the sum of the square values of the picture element values of the reference block, and means for determining the minimum error power value from the successively calculated error power values and outputting the motion vector for the reference block providing the minimum error power value as the motion vector for the current block.

According to a second aspect of the present invention, a motion estimating system in which a frame is divided into plural blocks and a reference block which is most correlative to a current block in a current frame is detected from a reference frame to determine a motion vector, is characterized by comprising inner product calculation means for calculating the inner product between the picture element values of the current block and some or all reference blocks in a reference area of the reference frame and multiplying the calculated inner product by −2 on a block by block basis, first reference block square sum calculation means for calculating the sum of square values of the picture element values of some or all the reference blocks in the reference area of the reference frame on a block by block basis, means for successively calculating error power estimative values by adding the value obtained by multiplying the inner product between the current block and the reference block by −2, and the sum of the square values of the picture element values of the reference block, and means for determining the minimum error power value from the successively calculated error power estimative values and outputting the motion vector for the reference block providing the minimum error power value as the motion vector for the current block.

According to a third aspect of the present invention, in the motion estimating system according to the first or second aspect, as the first reference block square sum calculation means may be provided second reference block square sum calculation means for calculating the sum of square values of the picture element values of all the reference blocks in the reference frame on a reference block basis.

According to a fourth aspect of the present invention, in the motion estimating system according to the first, second or third aspect of the present invention, the first or second reference block square sum calculation means comprises means for calculating the sum of square values over the whole block on the basis of the sum of square values of each block in a horizontal or vertical direction of the reference block.

According to a fifth aspect of the present invention, in the motion estimating system according to the first, second, third or fourth aspect of the present invention, the inner product calculation means comprises current block pre-processing means for thinning out the picture element values of the current block in each of horizontal and vertical directions by 2 to obtain four kinds of blocks and outputting totally nine auxiliary current blocks which are obtained by subjecting the four kinds of blocks to addition and subtraction calculation, reference area pre-processing means for thinning out the picture element values of the reference area in each of horizontal and vertical directions by 2 to obtain four kinds of areas and outputting totally nine auxiliary reference areas which are obtained by subjecting the four kinds of areas to addition and subtraction calculation, nine auxiliary inner product calculation means for calculating the inner product of the auxiliary current blocks and the auxiliary reference areas, and post-processing means for calculating the inner product result through the addition and subtraction calculation on the basis of the outputs of the nine auxiliary inner product calculation means.

According to a sixth aspect of the present invention, in the motion estimating system of the fifth aspect of the present invention, the inner product calculation means of the fifth aspect of the present invention is recursively used as the auxiliary inner calculation means.

According to a seventh aspect of the present invention, a motion estimating system in which a frame is divided into plural blocks, and when a reference block which is most correlative to a current block in a current frame is detected from a reference frame, an optimum reference block is determined from candidates containing a base reference block and reference blocks located around the base reference block in a reference area of the reference frame and set as a base reference block, this operation being repetitively performed to determine a motion vector, is characterized by comprising means for calculating the difference value between the sum of square values of the picture element values of the base reference block and the sum of square values of the picture element values of each of the reference blocks around the base reference block, means for calculating a value which is obtained by multiplying the inner product between the current block and the base reference block by −2, means for calculating a value which is obtained by multiplying the inner product between the current block and each of the reference blocks by 2, means for adding the calculation result, the differential value between the sum of the square values of the picture element values of the base reference block and the sum of the square values of the picture element values of the reference block concerned which are stored in storage means, and the value obtained by multiplying the inner product between the current block and the base reference block by −2, and means for detecting the minimum value from the addition result which is successively calculated for each search reference block, and outputting the motion vector corresponding to the reference block providing the minimum value as the motion vector for the current block when the minimum value is negative and outputting the motion vector corresponding to the base reference block as the motion vector for the current block when the minimum value is not negative.

According to an eighth aspect of the present invention, a motion estimating system in which a frame is divided into plural blocks and a reference block which is most correlative to a current block in a current frame is detected from a reference frame to determine a motion vector, is characterized by comprising the steps of calculating sum of the square values of picture element values in the current block, calculating the inner product between the picture element values of the current block and some or all reference blocks in a reference area of the reference frame and multiplying the calculated inner product by −2 on a block by block basis, calculating the sum of square values of the picture element values of some or all the reference blocks in the reference area of the reference frame, successively calculating error power values by adding the sum of square values of the picture element values of the current block, the value obtained by multiplying the inner product between the current block and the reference block by −2, and the sum of the square values of the picture element values of the reference block, determining the minimum error power value from the successively calculated error power values, and outputting the motion vector for the reference block providing the minimum error power value as the motion vector for the current block.

Next, the operation of the motion estimating system according to the first aspect of the present invention will be described.

The equation (1) is developed as follows.

$$e_{u,v} = \sum_{i=0}^{N-1}\sum_{j=0}^{N-1} x_{i,j}^2 - 2\sum_{i=0}^{N-1}\sum_{j=0}^{N-1} x_{i,j}y_{i+u,j+v} + \sum_{i=0}^{N-1}\sum_{j=0}^{N-1} y_{i+u,j+v}^2 \quad (2)$$

By developing the equation (1) as described above, the calculation amount of each term of the equation can be reduced, and also the data of each term can be effectively used for various purposes. These advantages will be described hereunder in detail.

The first term corresponds to the sum of the square values of the picture element values of the current block. The value of the first term is constant irrespective of the value (u,v) representing the position of the reference block, and thus it is sufficient to calculate the first term only once to estimate the motion vector of one current block. The second term corresponds to the value obtained by multiplying the inner product between the current block and the reference block by −2. This calculation needs (N×N+1) cycles per block.

This calculation must be performed on all the reference blocks to be searched, and has a calculation amount which is about a half of the total calculation amount for the equation (1). The third term corresponds to the sum of the square values of the picture element values of the reference block, and the calculation of the third term needs N×N cycles per block. Like the second term, the calculation of the third term must be also performed on all the reference blocks to be searched. Therefore, the calculations of the second and third terms need the same number of cycles as the total calculation of the equation (1), and further the calculation of the first term is required in addition to the above calculations. Therefore, the calculation amount cannot be reduced.

However, when the sum of the square values of the third item is calculated for each reference block to be searched, there exist many picture elements which are duplicated with one another. FIG. 8 is a diagram showing the duplication of the picture elements between the reference blocks. In order to simplify the description, the block size is set to 4 (pels) ×4 (pels), and the search range of the motion vector is set from −2 to +2. In this case, the size of the reference area which contains reference blocks to be searched is equal to 8 (pels) ×8 (pels). FIG. 8 typically shows reference blocks whose motion vectors are (0,0) and (1,−1). In this case, nine picture elements (pels) of 16 picture elements in each block are duplicated between the reference blocks. That is, when one motion vector is estimated, it is necessary to calculate the sum of the square values of picture element values of all the reference blocks to be searched in advance. However, at this time, the number of cycles required for the calculation of the third term can be greatly reduced by omitting the square sum calculation for the duplicative picture element values. With this omission, the calculation amount per current block can be reduced, resulting in reduction of the number of cycles required for the total calculation.

The second term of the equation (2) corresponds to a two-dimensional convolution calculation, and its calculation amount can be reduced by using FFT (Fast Fourier Transformation) or the method according to the fifth aspect of the present invention.

The first term of the equation (1) corresponds to the calculation of the sum of the square values (hereinafter referred to as "square sum calculation") of the picture element values of the current block, and this value is usable for the judgment of a predictive mode of INTRA/INTER which is executed after a motion estimation in a compression coding of pictures such as H.261 accommodated by ITU-T(the original name is CCITT) or the like.

Next, the operation of the motion estimating system according to the second aspect of the present invention will be described. Like the first aspect of the present invention, the equation (1) is developed into the equation (2). In this case, it is necessary that the equation (2) representing the error power value is calculated on all values of (u,v) to be searched, and the value (u,v) having the minimum value is detected. Here, the first term of the equation (2) is constant irrespective of the value (u,v), and thus it is unnecessary for a calculation for comparing large and small of the error value leaded from the value (u,v) when the resulting calculation of the equation (2) is compared each other.

In the motion estimating system of the first aspect, the first term is calculated only once, and this value is reused. However, in the motion estimating system of the second aspect, the first term is not calculated, and the sum of the second and third terms is used as an error power estimation value for the comparison calculation to detect the minimum value. With this operation, the motion estimating system of the second aspect has no advantage that the value of the first term is reused for the predictive mode judgment of INTRA/INTER and the minimum value of the error power values is calculated, however, the calculation amount can be further reduced because the first term is not required to be calculated.

Next, the operation of the motion estimating system according to the third aspect of the present invention will be described.

The motion estimating system of the third aspect also utilizes the fact that there is some duplication between reference areas each of which is provided for each block in the current frame. That is, there exist duplicative picture elements between reference blocks of different reference areas. FIG. 9 is a diagram showing the duplication between the reference blocks of different reference areas.

Now, neighboring blocks are represented by a block 1 and a block 2. As shown in FIG. 9, a reference area for the block 1 and a reference area for the block 2 are overlapped with each other. For example, a reference block having a motion vector (2,−2) for the block 1 is identical to a reference block having a motion vector (−2,−2) for the block 2. Accordingly, if the value of the third term required for the motion estimating processing of one frame is calculated in advance, the number of cycles required for the calculation of the third term can be further reduced.

Next, the operation of the motion estimating system according to the fourth aspect of the present invention will be described.

Like the first, second and third aspects of the present invention, the motion estimation is performed by developing the equation (1) into the equation (2). In the motion estimating system of the fourth aspect, the third term of the equation (2) is calculated while the calculation are divided into two groups in horizontal and vertical directions respectively, thereby reducing the calculation amount.

The third term of the equation (2) is represented by $f_{u,v}$ as follows:

$$f_{u,v} = \sum_{i=0}^{N-1} \sum_{j=0}^{N-1} y_{i+u,j+v}^2 \quad (3)$$

For example, the motion vector to be searched is represented as follows, and it is considered that all reference blocks to be searched in a reference area are searched. In this case, M represents an even number. In this case, the equation (3) is calculated for the following motion vector:

$$u,v = -M/2 + 1 \sim M/2$$

As described on the operation of the first aspect, there exist many picture elements which are duplicated between the reference blocks in the reference area. The calculation amount of the third item can be greatly reduced by omitting the calculation of the square values of the duplicative picture elements.

In the motion estimating system of the fourth aspect of the present invention, the calculation of the third term is performed while is separated in the horizontal and vertical directions. The case of successively calculating the third term in the horizontal direction and in the vertical direction in this order will be described. First, the sum of the square values of the picture element values of the reference blocks in the horizontal direction is calculated as follows:

$$f_{k,l} = \sum_{i=0}^{N-1} y_{i+k,l}^2 \quad (4)$$

$$k = -M/2 + 1, \ldots, M/2,$$
$$l = -M/2 + 1, \ldots, N + M/2 - 1$$

Next, the calculation of the third term is completed by adding the above calculation result in the vertical direction. That is, $$f_{u,v} = \sum_{j=0}^{N-1} f_{u,j+v} \quad u,v = -M/2 + 1, \ldots, M/2 \quad (5)$$

Here, the equations (4) and (5) can be cyclically calculated at a high speed as follows.

$$f_{k,l} = f_{k-1,l} + Y^2_{k+N-1,l} - Y^2_{k-1,l} \quad (6)$$

$$f_{u,v} = f_{u,v-1} + f_{u,v+N-1} - f_{u,v-1}$$

According to this method, the calculation amount for the third term can be reduced from $N^2 \times M^2$ cycles to $(N+M-1) \times (N+2M) + M \times (N+2M)$ cycles. For example, assuming that N=16 and M=32, the calculation amount can be reduced from 262,144 cycles to 6,320 cycles. This embodiment for calculating the third term of the equation (2) while separated in the horizontal direction and the vertical direction may be applicable irrespective of the value of M (i.e., to any case where M is an even number or an odd number).

The operation of the motion estimating system of the fifth aspect of the present invention will be described.

In this embodiment, like the first, second, third and fourth aspects, the equation (1) is developed into the equation (2) to perform the motion estimation. In this case, the second term of the equation (2) is performed as follows.

First, $c_{u,v}$ is defined as follows:

$$c_{u,v} = \sum_{i=0}^{N-1} \sum_{j=0}^{N-1} x_{i,j} y_{i+u,j+v} \quad (8)$$

the value $c_{u,v}$ thus defined is calculated for the following (u,v): u,v=−M/2+1∼M/2, and the value $c_{u,v}$ thus calculated is multiplied by −2. This calculation corresponds to the calculation of the second term of the equation (2) on all the reference blocks in a reference area when a search range of the motion vector is set as follows: u,v=−M/2+1∼M/2. Here, M represents an even number.

Here, $\hat{X}_{i,j}$, $\hat{Y}_{i,j}$ are defined as follows:

$$\hat{X}_{i,j} = [X_{i,j}, X_{i+2,j}, \ldots, X_{i+N-2,j}] \quad (9)$$

$$\hat{Y}_{i,j} = [Y_{i,j}, Y_{i+2,j}, \ldots, Y_{i+N-2,j}] \quad (10)$$

By using these values, $X_{i,j}$, $Y_{i,j}$ are defined as follows.

$$X_{i,j} = [\hat{X}_{i,j}, \hat{X}_{i,j+2}, \ldots, \hat{X}_{i,j+N-2}]^T \quad (11)$$

$$Y_{i,j} = [\hat{Y}_{i,j}, \hat{Y}_{i,j+2}, \ldots, \hat{Y}_{i,j+N-2}] \quad (12)$$

$X_{i,j}$ and $Y_{i,j}$ respectively represent a vector having elements whose number is equal to $N^2/4$. Each element is obtained by thinning out the picture element values of the current block and the N×N blocks at the position (i,j) of the reference area in each of the horizontal and vertical directions.

By using the above vectors, $c_{u,v}$, $c_{u+1,v}$, $c_{u,v+1}$, $c_{u+1,v+1}$ are defined as follows.

$$C_{u,v} = \begin{bmatrix} c_{u,v} \\ c_{u+1,v} \\ c_{u,v+1} \\ c_{u+1,v+1} \end{bmatrix} \quad (13)$$

$$= \begin{bmatrix} Y_{u,v} & Y_{u+1,v} & Y_{u,v+1} & Y_{u+1,v+1} \\ Y_{u+1,v} & Y_{u+2,v} & Y_{u+1,v+1} & Y_{u+2,v+1} \\ Y_{u,v+1} & Y_{u+1,v+1} & Y_{u,v+2} & Y_{u+1,v+2} \\ Y_{u+1,v+1} & Y_{u+2,v+1} & Y_{u+1,v+2} & Y_{u+2,v+2} \end{bmatrix} \begin{bmatrix} X_{0,0} \\ X_{1,0} \\ X_{0,1} \\ X_{1,1} \end{bmatrix}$$

Totally, 16 inner-product calculations of X and Y exist in the equation (13), however, the number of the inner-product calculations can be reduced.

$$\begin{bmatrix} A & B \\ B & C \end{bmatrix} \begin{bmatrix} X \\ Y \end{bmatrix} = \begin{bmatrix} (A+B)-B(X-Y) \\ (B+C)Y+B(X-Y) \end{bmatrix} \quad (14)$$

By applying the transformation of the equation (14) to four positions of the equation (13), $C_{u,v}$ is represented as follows:

$$C_{u,v} = \begin{bmatrix} (Y_{u,v}+Y_{u+1,v})X_{0,0} - Y_{u+1,v}(X_{0,0}-X_{1,0}) \\ (Y_{u+1,v}+Y_{u+2,v})X_{1,0} + Y_{u+1,v}(X_{0,0}-X_{1,0}) \\ (Y_{u,v+1}+Y_{u+1,v+1})X_{0,0} - Y_{u+1,v+1}(X_{0,0}-X_{1,0}) \\ (Y_{u+1,v+1}+Y_{u+2,v+1})X_{1,0} + Y_{u+1,v+1}(X_{0,0}-X_{1,0}) \end{bmatrix} + \quad (15)$$

$$\begin{bmatrix} (Y_{u,v+1}+Y_{u+1,v+1})X_{0,1} - Y_{u+1,v+1}(X_{0,1}-X_{1,1}) \\ (Y_{u+1,v+1}+Y_{u+2,v+1})X_{1,1} + Y_{u+1,v+1}(X_{0,1}-X_{1,1}) \\ (Y_{u,v+2}+Y_{u+1,v+2})X_{0,1} - Y_{u+1,v+2}(X_{0,1}-X_{1,1}) \\ (Y_{u+1,v+2}+Y_{u+2,v+2})X_{1,1} + Y_{u+1,v+2}(X_{0,1}-X_{1,1}) \end{bmatrix} +$$

$$= \begin{bmatrix} 1 & 0 \\ 0 & 0 \\ 0 & 1 \\ 0 & 0 \end{bmatrix} \begin{bmatrix} Y_{u,v}+Y_{u+1,v} & Y_{u,v+1}+Y_{u+1,v+1} \\ Y_{u,v+1}+Y_{u+1,v+1} & Y_{u,v+2}+Y_{u+1,v+2} \end{bmatrix} \begin{bmatrix} X_{0,0} \\ X_{0,1} \end{bmatrix} +$$

$$\begin{bmatrix} 0 & 0 \\ 1 & 0 \\ 0 & 0 \\ 0 & 1 \end{bmatrix} \begin{bmatrix} Y_{u+1,v}+Y_{u+2,v} & Y_{u+1,v+1}+Y_{u+2,v+1} \\ Y_{u+1,v+1}+Y_{u+2,v+1} & Y_{u+1,v+2}+Y_{u+2,v+2} \end{bmatrix} \begin{bmatrix} X_{1,0} \\ X_{1,1} \end{bmatrix} +$$

$$\begin{bmatrix} -1 & 0 \\ 1 & 0 \\ 0 & -1 \\ 0 & 1 \end{bmatrix} \begin{bmatrix} Y_{u+1,v} & Y_{u+1,v-1} \\ Y_{u+1,v+1} & Y_{u+1,v+2} \end{bmatrix} \begin{bmatrix} X_{0,0}-X_{1,0} \\ X_{0,1}-X_{1,1} \end{bmatrix}$$

Next, by further applying the transformation of the equation (14) to three positions of the equation (15), $C_{u,v}$ is represented by the equation (16).

$$C_{u,v} = \begin{bmatrix} (Y_{u,v}+Y_{u+1,v}+Y_{u,v+1}Y_{u+1,v+1})X_{0,0} \\ (Y_{u+1,v}+Y_{u+2,v}+Y_{u+1,v+1}+Y_{u+2,v+1})X_{1,0} \\ (Y_{u,v+1}+Y_{u+1,v+1}+Y_{u,v+2}+Y_{u+1,v+2})X_{0,1} \\ (Y_{u+1,v+1}+Y_{u+2,v+1}+Y_{u+1,v+2}+Y_{u+2,v+2})X_{1,1} \end{bmatrix} + \quad (16)$$

$$\begin{bmatrix} -1 & 0 \\ 0 & -1 \\ 1 & 0 \\ 0 & 1 \end{bmatrix} \begin{bmatrix} (Y_{u,v+1}+Y_{u+1,v+1}) & (X_{0,0}-X_{0,1}) \\ (Y_{u+1,v+1}+Y_{u+2,v+1}) & (X_{1,0}-X_{1,1}) \end{bmatrix} +$$

$$\begin{bmatrix} -1 & 0 \\ 1 & 0 \\ 0 & -1 \\ 0 & 1 \end{bmatrix} \begin{bmatrix} (Y_{u+1,v}+Y_{u+1,v+1}) & (X_{0,0}-X_{1,0}) \\ (Y_{u+1,v+1}+Y_{u+1,v+2}) & (X_{0,1}-X_{1,1}) \end{bmatrix} +$$

$$\begin{bmatrix} 1 \\ -1 \\ -1 \\ 1 \end{bmatrix} Y_{u+1,v+1}(X_{0,0}-X_{1,0}-X_{0,1}+X_{1,1})$$

By simultaneously calculating $c_{u,v}$, $c_{u+1,v}$, $c_{u,v+1}$ and $c_{u+1,v+1}$ and applying the transformation on the basis of the equation (14), the sixteen inner-product calculations in the equation (13) can be reduced to nine auxiliary inner-product calculations in the equation (16). When the block size is equal to N×N and the number of search points is equal to M×M, cycles of $N^2 \times M^2$ are necessary if the equation (8) or (13) is directly calculated. By transforming the equation as shown in the equation (16), the calculation amount of the auxiliary inner-product calculations can be reduced to 9/16× $(N^2 \times M^2)$ cycles, totally. In addition, cycles of $5N^2/4$ are required for the pre-processing of the current block of $X_{0,0}-X_{0,1}$, $X_{1,0}-X_{1,1}$, $X_{0,0}-X_{1,0}$, $X_{0,1}-X_{1,1}$, $X_{0,0}-X_{1,0}-X_{0,1}+X_{1,1}$, cycles of $2(N+M-2)\times(N+M-1)+(N+M-2)^2$ are required for the pre-processing of the reference region of $Y_{u,v}+Y_{u+1,v}+Y_{u,v+1}+Y_{u+1,v+1}$, $Y_{u+1,v}+Y_{u+2,v}+Y_{u+1,v+1}+Y_{u+2,v+1}$, $Y_{u,v+1}+Y_{u+1,v+1}+Y_{u,v+2}+Y_{u+1,v+2}$, $Y_{u+1,v+1}+Y_{u+2,v+1}+Y_{u+1,v+2}+Y_{u+2,v+2}$, $Y_{u+1,v}+Y_{u+1,v+1}$, $Y_{u+1,v+1}+Y_{u+1,v+2}$, and cycles of $10M^2/4$ are required for the post-processing for calculating $C_{u,v}$ on the basis of each auxiliary inner-product calculation result according to the equation (16). For N=16 and M=32, an auxiliary inner-product calculator needs $147 \times 10^3$ cycles, and pre-processing and post-processing units need $9.32 \times 10^3$ cycles, so that the overhead is very small.

FIG. 10 shows an inner-product calculator for the third term of the equation (2) according to the present invention. The inner-calculation of the equation (8) is divided into the nine auxiliary inner-product calculations as shown in the equation (16). In the pre-processing 81 for the current block, an auxiliary current block represented by "X" in the equation (16) is calculated from the picture element values of the current block. Auxiliary reference area values which are generated from the reference area picture element values in the pre-processing 82 for a reference area and are represented by "Y" in the equation (16) are input to the divided auxiliary inner-product calculators. According to the equation (16), $C_{u,v}$ is generated on the basis of the output values of the respective inner-product calculators 84-1 to 84-9 in the post-processing 83.

Next, the operation of the motion estimating system according to the sixth aspect of the present invention will be described.

In the motion estimating system of the sixth aspect of the present invention, the auxiliary inner-product calculations which are divided in the motion estimating system of the fifth aspect of the present invention is further recursively divided by using the equation (16). For example, if the division is further applied to all the nine auxiliary inner-product calculations which are divided in the fifth aspect of the present invention, totally, 81 auxiliary inner-product calculations are obtained. When the inner-product calculation is divided into nine auxiliary inner-product calculations, the calculation amount of the auxiliary inner-product calculator is equal to 9/16×$(N^2 \times M^2)$ cycles. On the other hand, when the inner-product calculation is divided into 81 auxiliary inner-product calculations, the calculation amount is reduced to $(9/16)^2 \times (N^2 \times M^2)$ cycles.

Next, the operation of the motion estimating system according to the seventh aspect of the present invention will be described.

The motion estimating system of this aspect aims to reduce the calculation amount when reference blocks around a reference block serving as a base are searched, for example, in the case of the logarithmic search method. Hereinafter, the reference block serving as the base is referred to as "base reference block", and the reference blocks around the base reference block are referred to as "peripheral reference blocks". For example, it is now considered to calculate the correlation with peripheral reference blocks of (u0+1,v0), (u0+1,v0+1), (u0,v0+1), (u0−1,v0+1), (u0−1,v0), (u0−1,v0−1), (u0,v0−1), (u0+1,v0−1) which are around the base reference block (u0,v0). In this case, the number of the peripheral reference blocks for which the correlation calculation is performed is equal to eight, and thus the optimum block is detected from the nine reference blocks containing the eight peripheral reference blocks and the base reference block. In this case, it is necessary to detect the minimum value from the equation (2) on the base vector (u0,v0) and the equation (2) on the other eight peripheral vectors. In this invention, the vector representing the minimum value is detected by using the difference between the equation (2) on the base vector (u0,v0) and the equation (2) on the other eight peripheral vectors. For example, the difference between $e_{u0,v0}$ and $e_{u0+1,v0-1}$ is represented as follows:

$$e_{u0,v0} - e_{u0+1,v0-1} = -2 \sum_{i=0}^{N-1} \sum_{j=0}^{N-1} x_{i,j} y_{u0+1,v0+j} + \qquad (17)$$

$$2 \sum_{i=0}^{N-1} \sum_{j=0}^{N-1} x_{i,j} y_{u0+i+1,v0+j-1} +$$

$$\left( \sum_{i=0}^{N-1} \sum_{j=0}^{N-1} y^2_{u0+i,v0+j} - \sum_{i=0}^{N-1} \sum_{j=0}^{N-1} y^2_{u0+i+1,v0+j-1} \right)$$

The first term of the above equation (17) corresponds to the inner product between the current block and the base reference block, and it is necessary to calculate the first term only once. The second term corresponds to the inner product between the current block and the reference block, and the calculation of the second term is performed on all the reference blocks to be searched. The third term corresponds to the difference between the sum of the square values of the picture element values of the base reference block and the sum of the square values of the picture element values of each reference block to be searched.

There exist common picture elements between the base reference block and the peripheral reference blocks, and the calculation is unnecessary for these common picture elements because the differential calculation is performed. FIG. 11 is a diagram showing the reference blocks when the block size is set to 4×4. Since there exist nine common picture elements between the base reference block and a reference block whose motion vector is equal to (1, −1) with respect to the base reference block, the calculation of the square values is unnecessary for these common picture elements. When the motion vector is searched in a range of ±1 in each of horizontal and vertical directions, the calculation of the square values is unnecessary for four picture elements as shown in FIG. 11. In this embodiment, the block size is set to 4×4. As the block size increases, the number of picture elements for which the calculation of the square values is unnecessary also increases. For example, when the block size is set to 16×16 and the search of the motion vector is performed in a range of ±1 around the base reference block, the calculation of the square values is unnecessary for 14×14 picture elements in all picture elements of 18×18.

As described above, the optimum reference block can be detected from the base reference block and the peripheral reference blocks with a small calculation amount. Representing the estimated motion vector by (U,V), the sum $e_{u,v}$ of square values of the difference between the reference block and the current block which corresponds to the motion vector can be calculated from the equation (17).

BRIEF DESCRIPTION OF THE DRAWINGS

FIG. 1 is a block diagram showing an embodiment according to first and third aspects of the present invention;

FIG. 2 is a block diagram showing an embodiment according to second and third aspects of the present invention;

FIG. 3 is a flowchart for the embodiment according to the first aspect of the present invention;

FIG. 4 is a flowchart for an embodiment according to a second aspect of the present invention;

FIG. 5 is a flowchart for the embodiment according to the third aspect of the present invention;

FIG. 6 is a flowchart for an embodiment according to a seventh aspect of the present invention;

DETAILED DESCRIPTION OF THE PREFERRED EMBODIMENTS

Figures 7, 8:
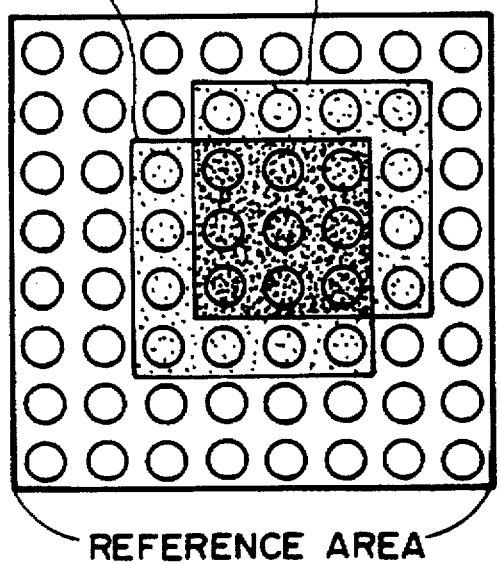
FIG. 7 is a diagram showing a calculation method of the sum of the square values of picture element values of a reference block in the seventh aspect.
FIG. 8 is a diagram showing the operation of the first aspect.
Figure 9:
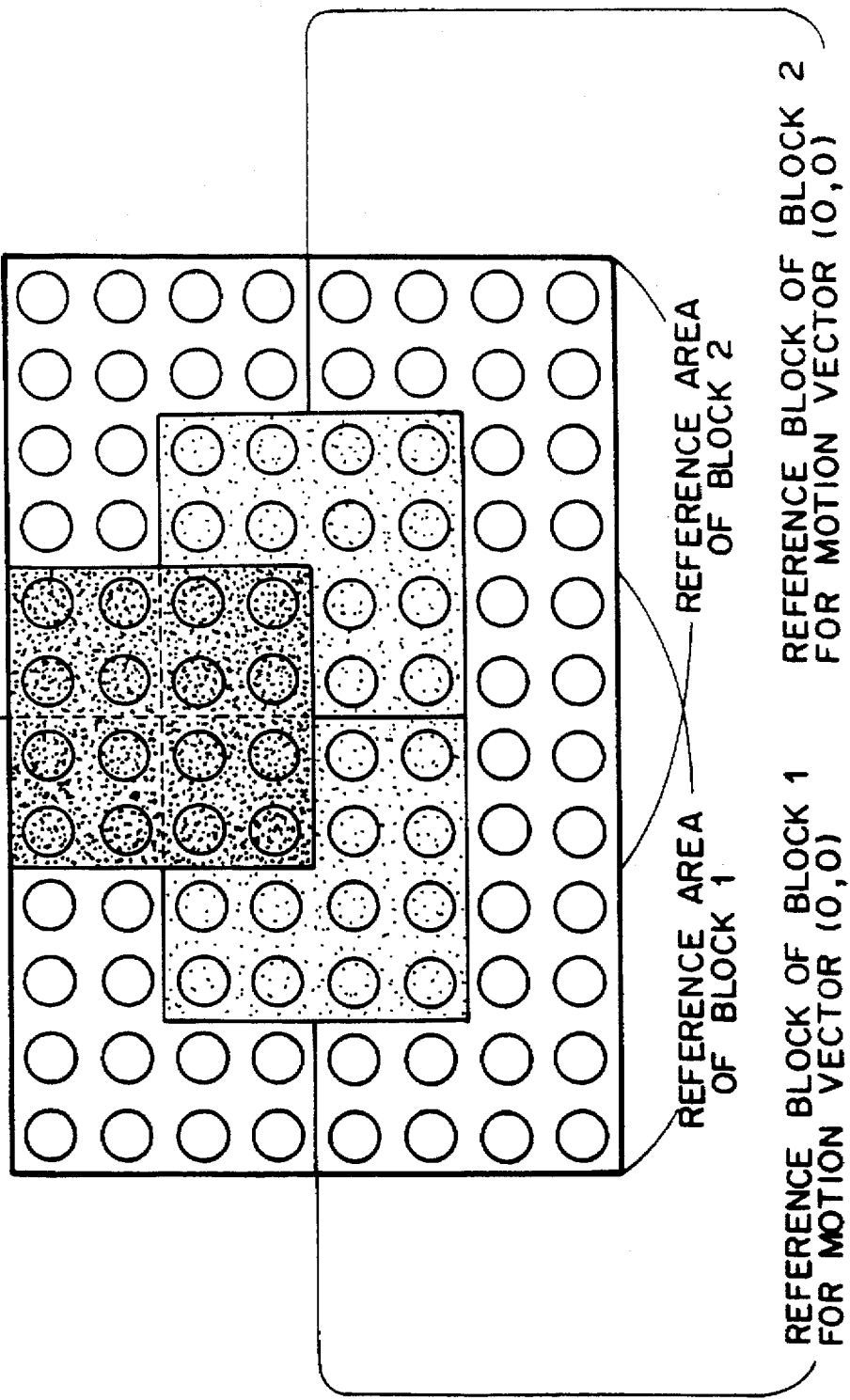
FIG. 9 is a diagram showing the operation of the third aspect.
Figure 10:
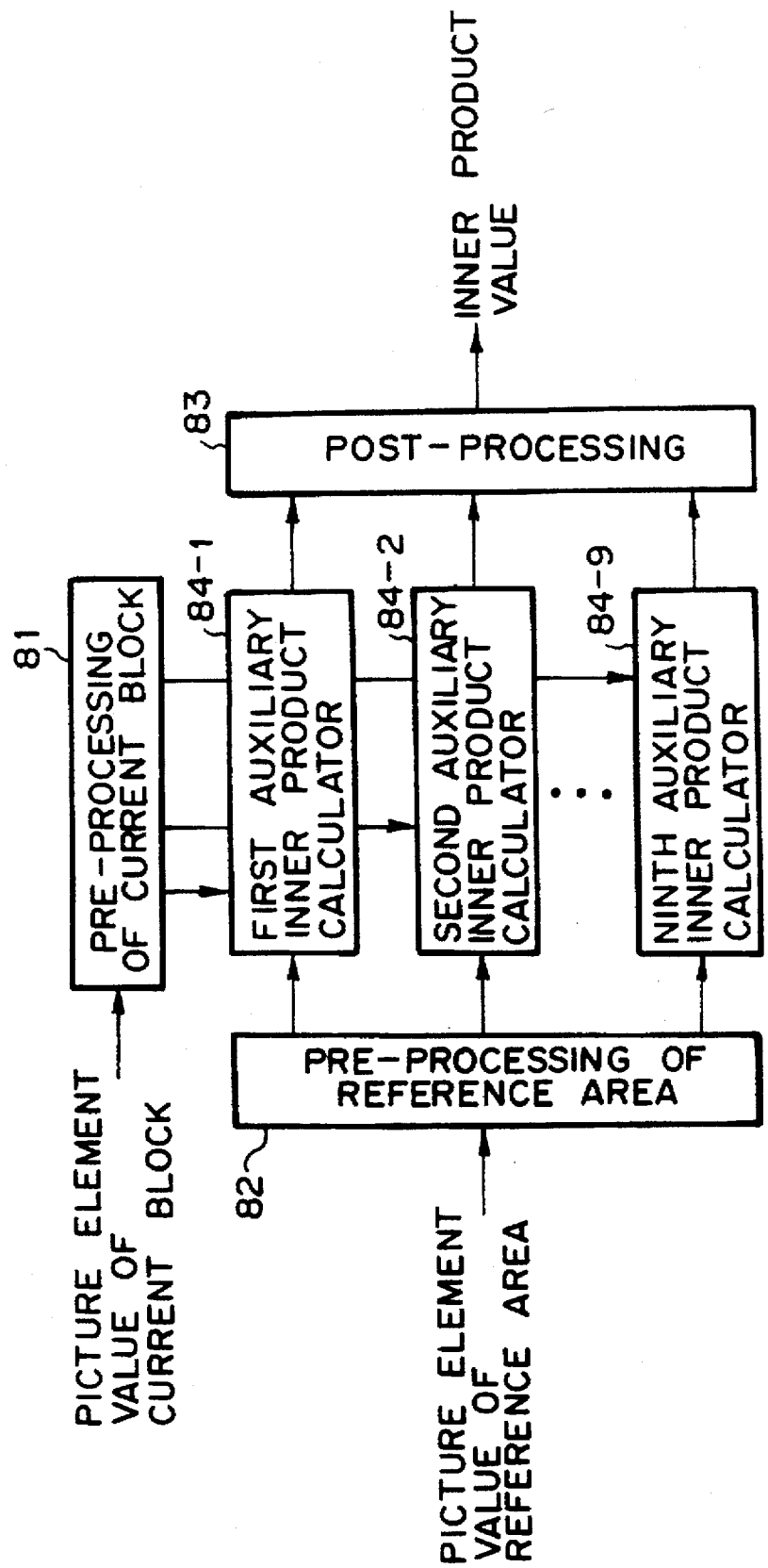
FIG. 10 is a block diagram showing the operation of a fifth aspect of the present invention.
Figure 11:
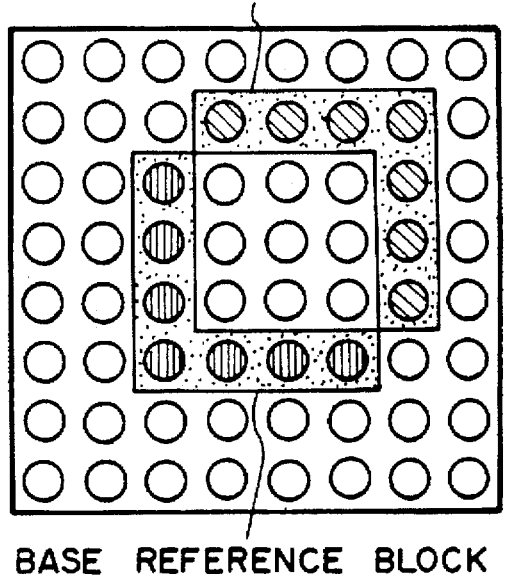
FIG. 11 is a diagram showing the operation of the seventh aspect.

Preferred embodiments according to the present invention will be described with reference to the accompanying drawings.

FIG. 1 is a block diagram showing an embodiment according to first and third aspects of the present invention. In a current-block square sum calculator 10, the sum of square values of picture element values of the current block, that is, the first term of the equation (2) is calculated, and then stored in a storage unit 13. Thereafter, in an inner-product calculator 11, the inner-product values of the picture element values between the current block and the reference block are multiplied by −2, that is, the second term of the equation (2) is calculated on all the reference blocks or some reference blocks, and then stored in a storage unit 14. In a reference-block square sum calculator 12, the sum of square values of picture elements of a reference block, the third term of the equation (2) is calculated on all the reference blocks or some reference blocks, and then stored in a storage unit 15. In an adder 16, the sum of the square values of the picture element values of the current block which is stored in the storage unit 13 and the calculation results for each motion vector under search which are stored in the storage units 14 and 15 are added, and then the addition result is set as an error power of the equation (2). The error power values which are calculated in the adder 16 are compared with one another in a motion vector determining unit 17, and the motion vector providing the minimum error power is output.

In the inner-product calculator 11 and the reference-block square sum calculator 12, the values corresponding to some or all of the motion vectors to be searches are calculated. When the values corresponding to some motion vectors are calculated, the effect of reducing the calculation amount is more reduced as compared with the case where the values corresponding to all the motion vectors are calculated, however, the storage capacity of the storage units 14 and 15 can be reduced.

FIG. 2 is a block diagram showing an embodiment according to second and third aspects of the present invention. Unlike FIG. 1, the calculation of the sum of square values of a current block is not performed. With this operation, both the advantages of the first aspect of the present invention that the value of the first term is reusable when the predictive mode judgment of INTRA/INTER is performed and that the minimum value of the error power can be calculated are reduced. However, since the calculation of the first term is unnecessary, the calculation amount can be further reduced.

Preferred embodiments according to the respective aspects of the present invention will be described in more detail.

FIG. 3 is a flowchart for detecting a motion vector for a current block according to the first aspect of the present invention. In step 30, a current block of a motion vector candidate to be first searched is set, and a minimum value which is used in step 36 is cleared. In step 31, the first term of the equation (2) which represents the sum of square values of picture element values of the current block is calculated and stored. In step 32, the inner product between the current block and each of some or all of the reference blocks in a reference area is multiplied by −2, and then stored. In step 33, the sum of square values of picture element values of some or all of the reference blocks in the reference area is calculated and stored. In steps 34 to 39, each motion vector is searched. In step 34, it is checked whether the calculation of the second and third terms of the equation (2) for a motion vector which is a current candidate has been completed. If the calculation has been completed, the calculated results of the second and third terms and the calculated result of the first term are added to obtain an error power. If the calculation has not been completed, the process returns to the step 32 to calculate a necessary calculation. If all necessary values are calculated in steps 32 and 33, the check of the step 34 is unnecessary. In step 36, it is judged whether the calculated error power is the minimum value in the motion vectors which have been searched. If it is the minimum value, the minimum value is renewed in step 37, and the motion vector providing this minimum value is stored. In step 38, it is judged whether the search operation on all the motion vectors to be searched is completed. If the search operation is not completed, a next motion vector is set in step 39, and the process returns to the step 34. If the search operation is completed, the minimum value of the error power and the motion vector corresponding to the minimum value are output in step 40.

FIG. 4 is a flowchart for the motion estimating system according to the second aspect of the present invention. The steps 41 to 44 and 46 to 50 are similar to those of FIG. 3 except step 31, and the description thereof is omitted. The different point from the processing of FIG. 3 resides in that the first term of the equation (2) is not calculated, and the values obtained by adding the second and third terms of the equation (2) are compared with one another as error power estimation values in step 46. Therefore, only the motion vector is output as a final result in step 50, and the minimum value of the error power is not output.

According to the motion estimating system of the third aspect, the calculation of the third term of the equation (2) in the first and second aspects is performed not for a value required to detect one motion vector, but for some or all of the values of the third term required to detect the motion vectors for all the blocks of a current frame.

FIG. 5 is a flowchart for detecting all the motion vectors of the current frame on the basis of the motion estimating system of the third aspect of the present invention. FIG. 5 shows an embodiment when the second and third aspects are combined with each other. In step 60, all the values of the third term of the equation (2) which are required to detect the motion vectors for one frame are calculated and stored. In step 61, a motion vector to be first searched is set when motion vectors for a block are searched, and the minimum value of the error power estimation value which is used in step 64 is cleared in advance. In step 62, all the values of the second term of the equation (2) which are required to detect the set motion vector are calculated and stored. In step 63, the calculated values of the second and third terms of the equation (2) are added to obtain an error power estimation value. In step 64, it is judged whether this error power estimation value is the minimum value. If it is judged to be the minimum value, the minimum value is renewed in step 65, and the motion vector at this time is stored. In step 66, it is judged whether the search operation on all the motion vector candidates is completed. If the search operation is judged not to be completed, a next motion vector candidate is set in step 67, and the process returns to the step 63. If the search operation is judged to be completed, the detected motion vector is output in step 68. In step 69, it is judged whether all the motion vectors of one frame are detected. If it is judged that all the motion vectors are detected, the process is finished. If not so, the process returns to the step 61 to detect the motion vector for a next block.

Next, an embodiment according to the fourth aspect of the present invention in which the calculation of the third term of the equation (2) is performed while separated into the calculation in the horizontal direction and the calculation in vertical directions. In order to simplify the description, the block size is set to 4×4, the size of the reference area is set to 8×8, and the picture elements of the reference area are represented by $Y_{-2,-2}$ to $Y_{5,5}$. In this case, the number of the reference blocks contained in the reference area is equal to 5 in the horizontal direction and 5 in the vertical direction, totally 25. All these reference blocks are searched. Therefore, the range of the motion vectors is set from −2 to 2.

First, $f'_{-2,-2}$ to $f'_{2,5}$ of the equation (4) are calculated as the calculation in the horizontal direction by using the recursive equation of the equation (6), and then stored. Here, an initial value $f'_{-2,1}$ is calculated by the following equation:

$$f'_{-2,l} = \sum_{i=-2}^{1} y_{i,l}^2, \; l=-2,-1,\ldots,5 \tag{18}$$

Next, $f_{-2,-2}$ to $f_{2,2}$ of the equation (5) are calculated as the calculation in the vertical direction by using the recursive equation of the equation (7) and then stored. An initial value $f_{u,-2}$ is calculated by the following equation:

$$f_{u,-2} = \sum_{j=-2}^{1} f'_{u,j}, \; u=-2,-1,\ldots,2 \tag{19}$$

The motion estimation according to the motion estimating system of the first, second or third aspect of the present invention is performed by using the third term of the equation (2) which is calculated as described above. For example, it is now considered that the block size is set to 16×16, the frame size is set to 176×144, the range of the motion estimation is set from −7 to 7, and all the reference blocks in the range are searched.

In the case of a processor type motion estimating device for performing each of the sum-of-product calculation and the arithmetic operation at one cycle, the conventional method for estimating the motion on the basis of the calculation of the equation (1) needs $11.4 \times 10^6$ cycles to estimate the motion of one frame, but the method using the first or fourth aspects of the present invention needs $6.01 \times 10^6$ cycles to estimate the motion of one frame. This means that the calculation amount is reduced to 52.7% of that of the prior art.

When the same motion estimation is performed by using the combination of the first, third and fourth aspects of the present invention, the motion estimation of one frame can be performed at $5.85 \times 10^6$. This means that the calculation amount is reduced to 51.3% of the prior art.

Next, a calculation method of the second term of the equation (2) will be described as a first embodiment of the fifth aspect of the present invention. In order to simplify the description, the block size is set to 4×4 and the motion vector range to be searched is set from −2 to 1 (i.e., totally 4×4 motion vectors are searched). In this case, the reference area is set to 7×7.

In this case, the calculation of the second term of the equation (2) corresponds to the calculation of $c_{-2,-2}$, $C_{0,-2}$, $C_{-2,0}$ and $C_{0,0}$ of the equation (16). Each calculation comprises nine auxiliary inner-product calculations. In the following description, $(Y_{u,v+1}+Y_{u+1,v+1})(X_{0,0}-X_{0,1})$ which is the fifth auxiliary inner-product calculation in the equation (16) will be typically described. First, the pre-processing of the current block in the equation (16) is performed. $(X_{0,0}-X_{0,1})$ which is the auxiliary current block on the fifth inner-product calculation is as follows:

$$X_{0,0}-X_{0,1}=[X_{0,0}, X_{2,0}, X_{0,2}, X_{2,2}]^T-[X_{0,1}, X_{2,1}, X_{0,3}, X_{2,3}]^T=[X_{0,0}-X_{0,1}, X_{2,0}-X_{2,1}, X_{0,2}-X_{0,3}, X_{2,2}-X_{2,3}]^T \quad (20)$$

Next, the pre-processing of the reference area in the equation (16) is performed. The calculation of $Y_{u,v+1}-Y_{u+1,v+1}$ which is the pre-processing value of the reference area on the fifth inner-product calculation will be described. The above equation is required to be performed when (u,v) is equal to (−2,−2), (0,−2), (−2,0), (0,0), and the following values of $Y_{u,v+1}-Y_{u+1,v+1}$ are obtained for the respective values of (u,v):

for (u,v)=(−2,−2), $$Y_{-2,-1} - Y_{-1,-1} = [y_{-2,-1}, y_{0,-1}, y_{-2,1}, y_{0,1}] - \quad (21)$$

$$[y_{-1,-1}, y_{1,-1}, y_{-1,1}, y_{1,1}] =$$

$$[y_{-2,-1} - y_{-1,-1}, y_{0,-1} - y_{1,-1}, y_{-2,1} - y_{-1,1}, y_{0,1} - y_{1,1}]$$

for (u,v) = (0,−2), $$Y_{0,-1} - Y_{1,-1} = [y_{0,-1}, y_{2,-1}, y_{0,1}, y_{2,1}] - \quad (22)$$

$$[y_{1,-1}, y_{3,-1}, y_{1,1}, y_{3,1}] =$$

$$[y_{0,-1} - y_{1,-1}, y_{2,-1} - y_{3,-1}, y_{0,1} - y_{1,1}, y_{2,1} - y_{3,1}]$$

for (u,v) = (−2,0), $$Y_{-2,1} - Y_{-1,1} = [y_{-2,1}, y_{0,1}, y_{-2,3}, y_{0,3}] - \quad (23)$$

$$[y_{-1,1}, y_{1,1}, y_{-1,3}, y_{1,3}] =$$

$$[y_{-2,1} - y_{-1,1}, y_{0,1} - y_{1,1}, y_{-2,3} - y_{-1,3}, y_{0,3} - y_{1,3}]$$

for (u,v) = (0,0), $$Y_{0,1} - Y_{1,1} = [y_{0,1}, y_{2,1}, y_{0,3}, y_{2,3}] - \quad (24)$$

$$[y_{1,1}, y_{3,1}, y_{1,3}, y_{3,3}] =$$

$$[y_{0,1} - y_{1,1}, y_{2,1} - y_{3,1}, y_{0,3} - y_{1,3}, y_{2,3} - y_{3,3}]$$

Sixteen differential calculations are contained in the equations (21) to (24). However, since there are some duplicative differential calculations, only nine differential calculations which are represented by $Y_{-2,-1}-Y_{-1,-1}$, $Y_{0,-1}-Y_{1,-1}$, $Y_{2,-1}-Y_{3,-1}$, $Y_{-2,1}-Y_{-1,1}$, $Y_{0,1}-Y_{1,1}$, $Y_{2,1}-Y_{3,1}$, $Y_{-2,3}-Y_{-1,3}$, $Y_{0,3}-Y_{1,3}$, $Y_{2,3}-Y_{3,3}$ are performed to perform the calculation for the auxiliary reference area. By extracting a part of the auxiliary reference area, the values of the equations (21) to (24) can be generated.

As described above, the calculation of $(Y_{u,v+1}+Y_{u+1,v+1})(X_{0,0}-X_{0,1})$ is performed for (u,v)=(−2,−2), (0,−2), (−2,0) and (0,0) on the basis of the calculated pre-processing result.

The calculation as described above is performed for the nine auxiliary inner-product calculations of the equation (16), and the final result $C_{u,v}$ is calculated according to the equation (16) in the post-processing.

A second embodiment of the fifth aspect of the present invention will be described. In the first embodiment, the second term of the equation (2) is calculated on the basis of the equation (16). The equation (16) is obtained by transforming the equation (13) with the equation (14). In this embodiment, the equation (13) is transformed by using the following equation (25) in place of the equation (14), and the calculation of the second term of the equation (2) is calculated on the basis of the transformed equation (26).

$$\begin{bmatrix} A & B \\ B & C \end{bmatrix} \begin{bmatrix} X \\ Y \end{bmatrix} = \begin{bmatrix} (A-B)X + B(X+Y) \\ (C-B)Y + (x+Y) \end{bmatrix} \quad (25)$$

The calculation as described above can be performed in the same manner as the first embodiment, and the calculation amount is also equal to that of the first embodiment.

As an embodiment of the sixth aspect of the present invention, the auxiliary inner-product calculation as described in the first embodiment of the fifth aspect of the present invention, $(Y_{u,v+1}+Y_{u+1,v+1})(X_{0,0}-X_{0,1})$ is further divided. This formula is represented by $C'_{u,v}$.

In this case, it is necessary to calculate $c'_{u,v}$ for (u,v)

$$C_{u,v} = \begin{bmatrix} (Y_{u,v} - Y_{u+1,v} - Y_{u,v+1} + Y_{u+1,v+1})X_{0,0} \\ (-Y_{u+1,v} + Y_{u+2,v} + Y_{u+1,v+1} - Y_{u+2,v+1})X_{1,0} \\ (-Y_{u,v+1} + Y_{u+1,v+1} + Y_{u,v+2} - Y_{u+1,v+2})X_{0,1} \\ (Y_{u+1,v+1} - Y_{u+2,v+1} - Y_{u+1,v+2} + Y_{u+2,v+2})X_{1,1} \end{bmatrix} + \quad (26)$$

$$\begin{bmatrix} 1 & 0 \\ 0 & 1 \\ 1 & 0 \\ 0 & 1 \end{bmatrix} \begin{bmatrix} (Y_{u,v+1} - Y_{u+1,v+1}) & (X_{0,0} + X_{0,1}) \\ (-Y_{u+1,v+1} + Y_{u+2,v+1}) & (X_{1,0} + X_{1,1}) \end{bmatrix} +$$

$$\begin{bmatrix} 1 & 0 \\ 1 & 0 \\ 0 & 1 \\ 0 & 1 \end{bmatrix} \begin{bmatrix} (Y_{u+1,v} - Y_{u+1,v+1}) & (X_{0,0} + X_{1,0}) \\ (-Y_{u+1,v+1} + Y_{u+1,v+2}) & (X_{0,1} + X_{1,1}) \end{bmatrix} +$$

$$\begin{bmatrix} 1 \\ 1 \\ 1 \\ 1 \end{bmatrix} Y_{u+1,v+1}(X_{0,0} + X_{1,0} + X_{0,1} + X_{1,1})$$

= (−2,−2),(0,−2),(−2,0) and (0,0) (equation (27)).

$$c'_{u,v} = (Y_{u,v+1} + Y_{u+1,v+1})(X_{0,0} - X_{0,1}) \quad (27)$$

-continued $$= \sum_{i=0}^{i} \sum_{j=0}^{i} (x_{2i,2j} - x_{2i,2j+1})(y_{2i+u,2j+v+1} + y_{2i+u+1,2j+v+1})$$

Here, $X'_{i,j}$, $Y'_{i,j}$, $u'$, $v'$ are defined as follows.

$$X'_{i,j} = (X_{2i,2j} - X_{2i,2j+1}) \tag{28}$$

$$Y'_{i,j} = (Y_{2i,2j+1} - Y_{2i+1}) \tag{29}$$

$$u' = u/2 \tag{30}$$

$$v' = v/2 \tag{31}$$

By using this definition, the equation (27) is transformed by the equation (32).

$$c'_{2u',2v'} = \sum_{i=0}^{1} \sum_{j=0}^{1} x'_{i,j} y'_{i+u',j+v'} \tag{32}$$

The above equation is calculated for $u',v'=-1$ to $0$. Since this equation has the same format as the equation (8), this equation is divided like the equation (16) in the same manner as the fifth aspect of the present invention to reduce the calculation amount.

FIG. 6 is a flowchart for the motion estimating system according to the seventh aspect of the present invention. The motion estimating system of the seventh aspect is applicable to search peripheral reference blocks of a base reference block. In step 70, all the values of the third term which are required to calculate the equation (17) for the peripheral reference blocks are calculated and stored. This calculation method will be described in detail later.

In step 71, the first term of the equation (17) is calculated in the sum-of-product calculator, and stored. The first term of the equation (17) corresponds to a value obtained by multiplying the inner product between the current block and the base reference block by $-2$, and the second term of the equation (17) corresponds to a value obtained by multiplying the inner product between the current block and the reference block by 2. Therefore, if these terms have been already calculated in the previous search, this calculation can be simplified. In step 72, a motion vector to be first searched, that is, a reference block is set. In addition, the minimum value used in step 74 is cleared in advance. Subsequently, each reference block is searched in steps 73 to 77.

In step 73, the second term of the equation (17) corresponding to the inner product between the current block and the reference block which is multiplied by 2 is calculated in the sum-of-product calculator, and added with the calculated first term and the corresponding third term in the arithmetic and logic calculator. In step 74, it is judged whether the result of the step 73 is the minimum value in the reference blocks which have been searched. If the result of the step 73 is a positive value, it means that the base reference block is more suitable than the reference block concerned, so that the result of the step 73 is judged not to be the minimum value. If it is judged to be the minimum value, the minimum value is renewed in step 75, and the motion vector at this time is stored.

In step 76, it is judged whether the search of all the reference blocks to be searched is completed. If the search is judged not to be completed, a next motion vector is set in step 77, and the process returns to the step 73. If the search is judged to be completed, in step 78 the motion vector corresponding to the minimum value is output, and the sum of square values of the difference between the corresponding reference block and the current block is calculated on the basis of the equation (17), and output. Further, the value calculated by multiplying the inner product between the current block and the corresponding reference block by 2 is also output. With this operation, the calculation of the first term of the equation (17) can be reduced when the corresponding reference block is newly set as a base reference block and peripheral reference blocks around the reference block serving as the base reference block are searched.

The calculation of the step 70 will be described in more detail.

Figure 12:
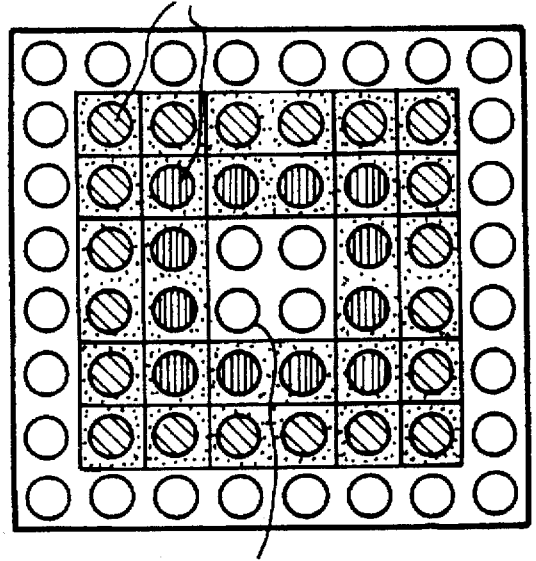
FIG. 12 is a diagram showing the operation of the seventh aspect.
Figure 13A:
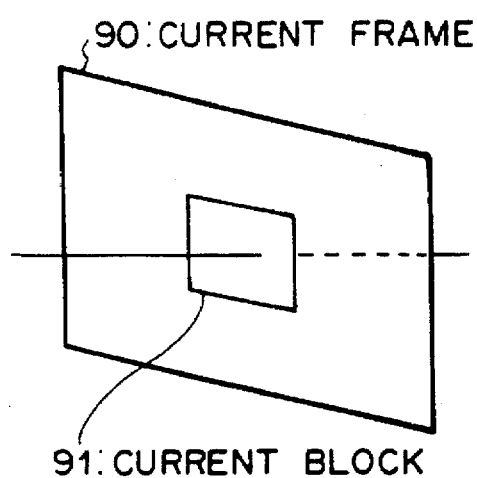
FIG. 13(a) and 13(b) are a diagram showing a motion estimating system.
Figure 13B:
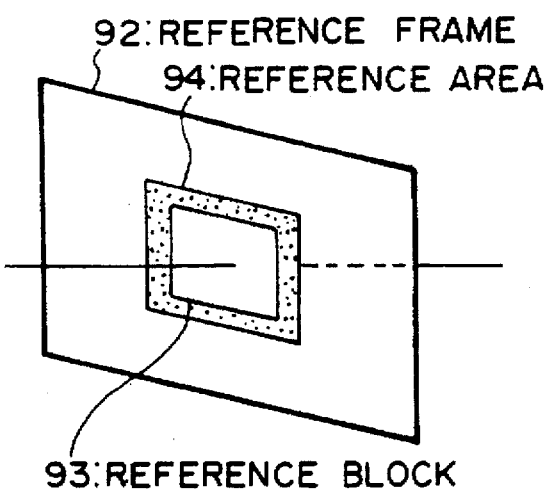
Figure 14:
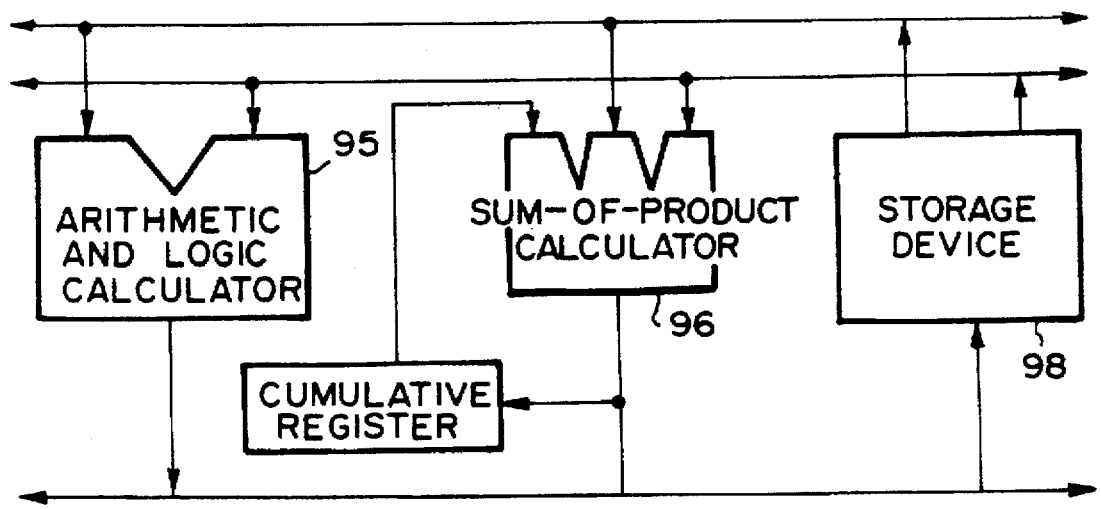
FIG. 14 shows a processor having a sum-of-product calculator.
Figure 15:
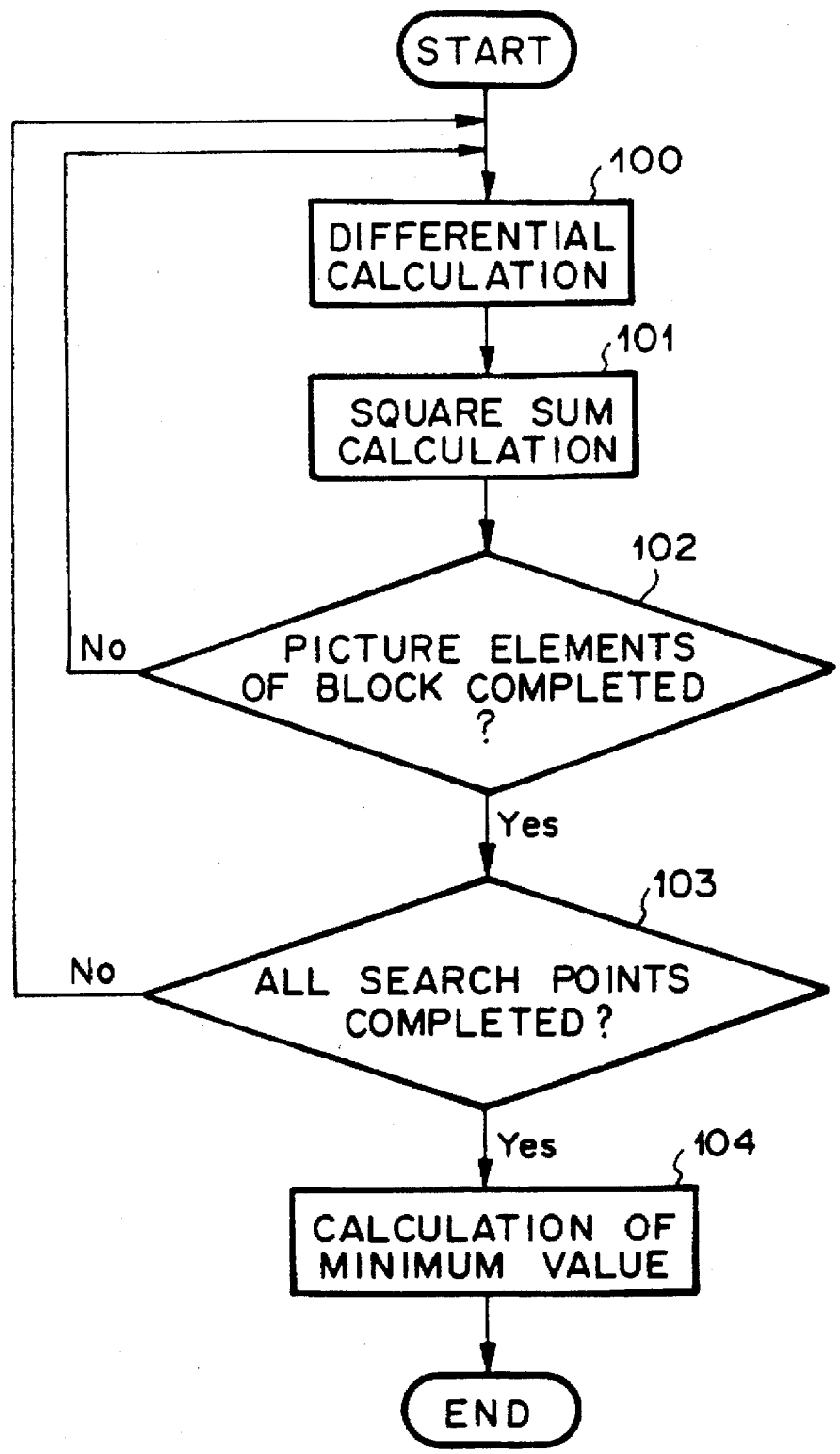
FIG. 15 is a flowchart for a conventional motion estimating system.

As an example, it is considered that the block size is set to 4×4, and motion vectors are searched in a range of ±1 in each of the horizontal and vertical directions. In this case, as shown in FIG. 12, there exist picture elements for which the calculation of the square values is required. These picture elements are sectioned into areas of P1 to P16 and Q1 to Q8 as shown in FIG. 7, and the sum of square values of picture element values in each area is first calculated in the sum-of-product calculator. In this case, only one picture element exists in the area P1, and thus the sum of square values in this area corresponds to the sum of square value of one picture element. For example, when the motion vectors are searched in a range of ±4, the area P1 contains 4×4 blocks. The third term of the equation (17) is calculated by combining the sums of square values of these picture elements. For example, the third term of the equation (17) when the motion vector based on the base reference block is (1,−1) as shown in FIG. 12 is calculated in the arithmetic and logic calculator as follows:

$$(Q1+Q8+Q7+Q6+Q5)-(P3+P4+P5+P6+P7)$$

For example, it is now considered that the block size is set to 16×16, the frame size is set to 176×144, the motion estimating range is set from −7 to 7 and reference blocks in this range are searched by the logarithmic search method while the position of the motion vector to be searched is successively set to ±4, ±2 and ±1 in this order. In the case of a processor which executes the sum-of-product calculation and the arithmetic and logic calculation at one cycle, the conventional method for calculating the equation (1) for the motion estimation needs $1.27 \times 10^6$ cycles to estimate the motion of one frame. On the other hand, the method of the present invention needs $0.753 \times 10^6$ cycles to estimate the motion of one frame. This means that the calculation amount is reduced to 59.4% of the conventional method.

As described above, according to the present invention, when the motion of moving pictures is estimated, the equation (1) is calculated while developed into several terms. Therefore, the calculation amount of each term can be greatly reduced, and the data of each term are effectively used for other purposes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A motion estimating system in which a frame is divided into plural blocks and a reference block which is most correlative to a current block in a current frame is detected from a reference frame to determine a motion vector, comprising:

means for calculating a sum of square values of picture element values in the current block;

inner product calculation means for calculating the inner product between the picture element values of the current block and some reference blocks in a reference area of the reference frame and multiplying the calculated inner product by −2 on a block by block basis;

first reference block square sum calculation means for calculating the sum of square values of picture element values of some the reference blocks in the reference area of the reference frame on a block by block basis;

means for successively calculating error power values by adding the sum of the square values of the picture element values of the current block, the value obtained by multiplying the inner product between the current block and the reference block by −2, and the sum of the square values of the picture element values of the reference block; and means for determining the minimum error power value from the successively calculated error power values and outputting the motion vector for the reference block providing the minimum error power value as the motion vector for the current block.

2. The motion estimating system as claimed in claim 1, wherein said first reference block square sum calculation means includes second reference block square sum calculation means for calculating the sum of square values of the picture element values of all the reference blocks in the reference frame on a reference block basis.

3. The motion estimating system as claimed in claim 1, wherein said first reference block square sum calculation means comprises means for calculating the sum of square values over the whole block on the basis of the sum of square values of each block in a horizontal and vertical direction of the reference block.

4. The motion estimating system as claimed in claim 1, wherein said inner product calculation means comprises current block pre-processing means for thinning out the picture element values of the current block in each of horizontal and vertical directions by 2 to obtain four kinds of blocks and outputting totally nine auxiliary current blocks which are obtained by subjecting the four kinds of blocks to addition and subtraction calculations, reference area pre-processing means for thinning out the picture element values of the reference area in each of horizontal and vertical directions by 2 to obtain four kinds of areas and outputting totally nine auxiliary reference areas which are obtained by subjecting the four kinds of areas to addition and subtraction calculation, nine auxiliary inner product calculation means for calculating the inner product of the auxiliary current blocks and the auxiliary reference areas, and post-processing means for calculating the inner product result through the addition and subtraction calculation on the basis of the outputs of said nine auxiliary inner product calculation means.

5. The motion estimating system as claimed in claim 4, wherein said inner product calculation means is recursively used as said auxiliary inner calculation means.

6. The motion estimating system as claimed in claim 1, further comprising:

a first storage unit for storing the sum results from said means for calculating a sum of square values of picture element values in the current block;

a second storage unit for storing the value of the calculated inner product by −2 times calculated by said inner product calculation means;

a third storage unit for storing the first reference block square sum calculation results from said first reference block square calculation means, said means for successively calculating error power values adding the sum of the square values of the picture element values of the current block stored in said first storage unit, the value obtained by multiplying the inner product between the current block and the reference block by −2 stored in said second storage unit, and the sum of the square values of the picture element values of the reference block stored in said third storage unit.

7. A motion estimating system in which a frame is divided into plural blocks and a reference block which is most correlative to a current block in a current frame is detected from a reference frame to determine a motion vector, comprising:

inner product calculation means for calculating the inner product between the picture element values of the current block and some reference blocks in a reference area of the reference frame and multiplying the calculated inner product by −2 on a block by block basis;

first reference block square sum calculation means for calculating the sum of square values of the picture element values of some the reference blocks in the reference area of the reference frame;

means for successively calculating error power estimative values by adding the value obtained by multiplying the inner product between the current block and the reference block by −2, and the sum of the square values of the picture element values of the reference block; and means for determining the minimum error power value from the successively calculated error power estimative values and outputting the motion vector for the reference block providing the minimum error power value as the motion vector for the current block.

8. The motion estimating system as claimed in claim 7, wherein said first reference block square sum calculation means includes second reference block square sum calculation means for calculating the sum of square values of the picture element values of all the reference blocks in the reference frame on a reference block basis.

9. The motion estimating system as claimed in claim 7, wherein said first reference block square sum calculation means comprises means for calculating the sum of square values over the whole block on the basis of the sum of square values of each block in a horizontal and vertical direction of the reference block.

10. The motion estimating system as claimed in claim 7, wherein said inner product calculation means comprises current block pre-processing means for thinning out the picture element values of the current block in each of horizontal and vertical directions by 2 to obtain four kinds of blocks and outputting totally nine auxiliary current blocks which are obtained by subjecting the four kinds of blocks to addition and subtraction calculations, reference area pre-processing means for thinning out the picture element values of the reference area in each of horizontal and vertical directions by 2 to obtain four kinds of areas and outputting totally nine auxiliary reference areas which are obtained by subjecting the four kinds of areas to addition and subtraction calculation, nine auxiliary inner product calculation means for calculating the inner product of the auxiliary current blocks and the auxiliary reference areas, and post-processing means for calculating the inner product result through the addition and subtraction calculation on the basis of the outputs of said nine auxiliary inner product calculation means.

11. The motion estimating system as claimed in claim 10, wherein said inner product calculation means is recursively used as said auxiliary inner calculation means.

12. The motion estimating system as claimed in claim 7, further comprising:
- a first storage unit for storing the value of the calculated inner product by −2 times calculated by said inner product calculation means;
- a second storage unit for storing the value of the calculated sum of square values calculated by said first reference block square sum calculation means, said means for successively calculating error power estimative values adding the value obtained by multiplying the inner product between the current block and the reference block by −2 stored in said first storage unit, and the sum of the square values of the picture element values of the reference block stored in said second storage unit.

13. A motion estimating system in which a frame is divided into plural blocks, and when a reference block which is most correlative to a current block in a current frame is detected from a reference frame, an optimum reference block is determined from candidates containing a base reference block and reference blocks located around the base reference block in a reference area of the reference frame and set as a base reference block, this operation being repetitively performed to determine a motion vector, comprising:
- means for calculating the difference value between the sum of square values of the picture element values of the base reference block and the sum of square values of the picture element values of each of the reference blocks around the base reference block;
- means for calculating a value which is obtained by multiplying the inner product between the current block and the base reference block by −2;
- means for calculating a value which is obtained by multiplying the inner product between the current block and each of the reference blocks by 2;
- means for adding the calculation result, the differential value between the sum of the square values of the picture element values of the base reference block and the sum of the square values of the picture element values of the reference block, and the value obtained by multiplying the inner product between the current block and the base reference block by −2; and
- means for detecting the minimum value from the addition result which is successively calculated for each search reference block, and outputting the motion vector corresponding to the reference block providing the minimum value as the motion vector for the current block when the minimum value is negative or outputting the motion vector corresponding to the base reference block as the motion vector for the current block when the minimum value is not negative.

14. The motion estimating system as claimed in claim 13, further comprising:
- a first storage unit for storing the difference value calculated by said means for calculating the difference value;
- a second storage unit for storing the result value from said means for calculating a value which is obtained by multiplying the inner product between the current block and the base reference block by −2;
- a third storage unit for storing the result value from said means for calculating a value which is obtained by multiplying the inner product between the current block and each of the reference blocks by 2 said adding means adding the calculation result stored in said first storage unit, the differential value between the sum of the square values of the picture element values of the base reference block and the sum of the square values of the picture element values of the reference block stored in said second storage unit, and the value obtained by multiplying the inner product between the current block and the base reference bloc by −2 stored in said third storage unit.

15. A motion estimating method in which a frame is divided into plural blocks and a reference block which is most correlative to a current block in a current frame is detected from a reference frame to determine a motion vector, comprising the steps of:
- calculating a sum of the square values of picture element values in the current block;
- calculating the inner product between the picture element values of the current block and some reference blocks in a reference area of the reference frame and multiplying the calculated inner product by −2 on a block by block basis;
- calculating the sum of square values of the picture element values of some of the reference blocks in the reference area of the reference frame on a block by block basis;
- successively calculating error power values by adding the sum of square values of the picture element values of the current block, the value obtained by multiplying the inner product between the current block and the reference block by −2, and the sum of the square values of the picture element values of the reference block;
- determining the minimum error power value from the successively calculated error power values; and
- outputting the motion vector for the reference block providing the minimum error power value as the motion vector for the current block.

16. The motion estimating method of claim 15, further comprising the steps of:
- storing the sum of the square values in a first storage unit after said step of calculating sum of sum of the square values of picture element values in the current block;
- storing the inner product in a second storage unit after said step of calculating the inner product; and
- storing the sum of square values in a third storage unit after said step of calculating the sum of the square values of the picture element values of some of the reference blocks, wherein said step of successively calculating error power values further comprises adding the sum of square values of the picture element values of the current block stored in said first storage unit, the value obtained by multiplying the inner product between the current block and the reference block by −2 stored in said second storage unit, and the sum of the square values of the picture element values of the reference block stored in said third storage unit.

* * * * *